US010065797B2

(12) United States Patent
Eskenas

(10) Patent No.: US 10,065,797 B2
(45) Date of Patent: Sep. 4, 2018

(54) FIRE EFFECT SENSOR ACTIVATED TRASHCAN

(71) Applicant: Shari Eskenas, Redondo Beach, CA (US)

(72) Inventor: Shari Eskenas, Redondo Beach, CA (US)

( * ) Notice: Subject to any disclaimer, the term of this patent is extended or adjusted under 35 U.S.C. 154(b) by 0 days.

(21) Appl. No.: 15/469,545

(22) Filed: Mar. 26, 2017

(65) Prior Publication Data

US 2017/0283168 A1 Oct. 5, 2017

Related U.S. Application Data

(60) Provisional application No. 62/316,256, filed on Mar. 31, 2016.

(51) Int. Cl.
*G09B 19/00* (2006.01)
*B65F 1/10* (2006.01)
*B65F 1/14* (2006.01)
*B65F 1/06* (2006.01)

(52) U.S. Cl.
CPC .................. *B65F 1/10* (2013.01); *B65F 1/06* (2013.01); *B65F 1/062* (2013.01); *B65F 1/14* (2013.01); *B65F 2210/139* (2013.01); *B65F 2210/16* (2013.01); *B65F 2210/168* (2013.01); *G10H 2220/411* (2013.01); *G10H 2250/405* (2013.01)

(58) Field of Classification Search
CPC .... B65F 1/06; B65F 1/062; B65F 1/10; B65F 1/1638; B65F 2210/168; B65F 2210/139; B65F 2210/144; B65F 2210/152; A47L 7/00; A47L 1/0047; G06Q 10/08; G06Q 10/087
See application file for complete search history.

(56) References Cited

U.S. PATENT DOCUMENTS

| | | | | |
|---|---|---|---|---|
| 9,586,755 | B1 * | 3/2017 | Yang | E05F 15/73 |
| 2004/0191736 | A1 * | 9/2004 | Werhun | G09B 19/00 434/226 |
| 2017/0096299 | A1 * | 4/2017 | Yang | B65F 1/1638 |
| 2017/0127669 | A1 * | 5/2017 | Yang | B65F 1/02 |
| 2017/0210559 | A1 * | 7/2017 | Howard | B65F 1/105 |

* cited by examiner

*Primary Examiner* — Van Trieu
(74) *Attorney, Agent, or Firm* — Edwin Tarver

(57) ABSTRACT

The present invention provides a trashcan or wastebasket that has lights and sounds simulating a fire that are activated when trash is thrown inside or on the verge of being thrown inside. One particular activation method consists of sensors housed at the top of the trashcan that detect when trash is thrown in. Once the trash is detected, the walls of the trashcan light up and flicker with an orange color like a fire and crackling fire sounds play. The lights and sounds play for a short interval and then stop until trash is detected again.

10 Claims, 3 Drawing Sheets

FIRE EFFECT SENSOR ACTIVATED TRASHCAN

The present disclosure claims priority to U.S. Provisional Patent Application Ser. No. 62/316,256, filed on Mar. 31, 2016, entitled "Sensor Activated Trashcan", the entirety of which is incorporated herein by reference.

FIELD OF INVENTION

The present invention generally relates to trashcans and in particular to the lights and sounds fire effect sensor activated trashcan.

BACKGROUND OF INVENTION

It is well known that in people's residence or at their office people will place a trashcan for holding trash and other debris. People may feel less stressed and feel greater well being after disposing of trash or unwanted items, as this improves the cleanliness and organization of their surroundings, or removes something that may evoke negative thoughts or memories. Likewise, throwing trash or unwanted items into a fire can provide a similar, and arguably greater sense of relief. However, it is not practical nor convenient to throw trash or unwanted items into a real fire on a consistent basis. Therefore, there is a need for a trashcan with an electronic fire effect that simulates the illumination and sounds of a real fire, with a sensor that conditionally activates the lights and sounds of the fire effect. The fire effect sensor activated trashcan can also make the mundane task of throwing away trash an enjoyable experience through the novelty of the fire effect.

BRIEF SUMMARY OF THE INVENTION

A trashcan that has lights and sounds simulating a fire that are activated when trash is thrown inside or is on the verge of being thrown inside is disclosed. As a particular embodiment of an activation method, the lights and sounds are activated when sensors housed at the top of the trashcan detect when trash is being thrown in. Once the trash is detected, the walls of the trashcan light up and flicker with an orange color like a fire and crackling fire sounds are played. The lights and sounds play for a short interval and then stop until trash is detected again.

In addition to the various objects and advantages of the present invention described with some degree of specificity above it should be obvious that additional objects and advantages of the present invention will become more readily apparent to those persons who are skilled in the relevant art from the following more detailed description of the invention.

BRIEF DESCRIPTION OF THE DRAWINGS

To further clarify various aspects of some example embodiments of the present invention, a more particular description of the invention will be rendered by reference to specific embodiments thereof which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which.

DETAIL DESCRIPTION OF THE INVENTION

Figure 1:
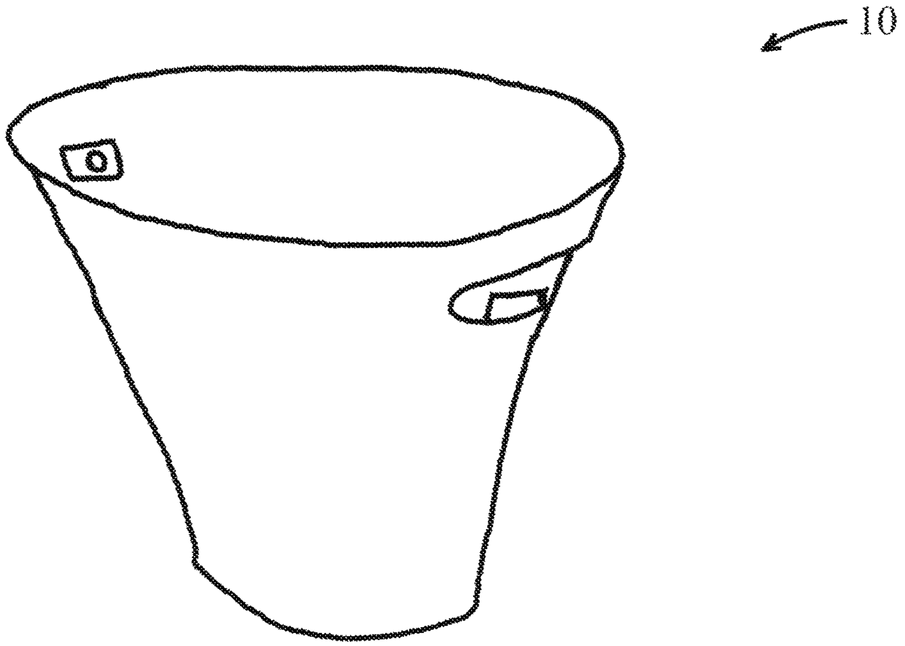
FIG. 1 is a perspective photographic representation of the fire effect sensor activated trashcan in accordance with the present invention.
Figure 2:
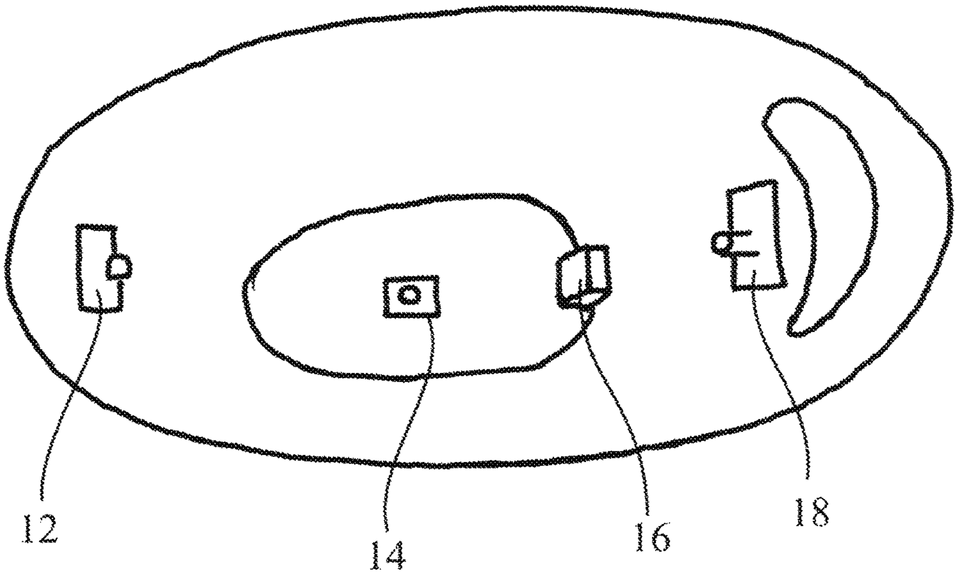
FIG. 2 is a photographic view of the fire effect sensor activated trashcan illustrating sensor mounting locations in accordance with the present invention.
Figure 3:
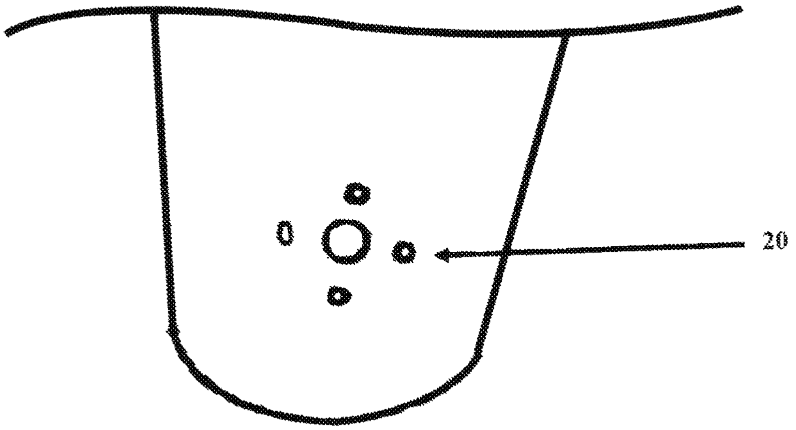
FIG. 3 is another photographic view of the fire effect sensor activated trashcan illustrating a speaker location in accordance with the present invention.

Referring now to FIG. 1, there is shown a generally shaped trashcan body 10 in accordance with the present invention that has lights and sounds that are activated when trash is thrown inside. More particularly and referring to FIG. 2, sensors 12 and 18 are housed at the top of the trashcan that detect when trash is thrown in. In one preferred embodiment, the sensors 12 and 18 are an infrared receiver 12 and an infrared LED 18. Once the trash is detected, the walls of the trashcan light up and flicker (not shown) with an orange color like a fire, and crackling fire sounds play. The lights and sounds play for a short interval and then stop until trash is detected again.

Figure 4:
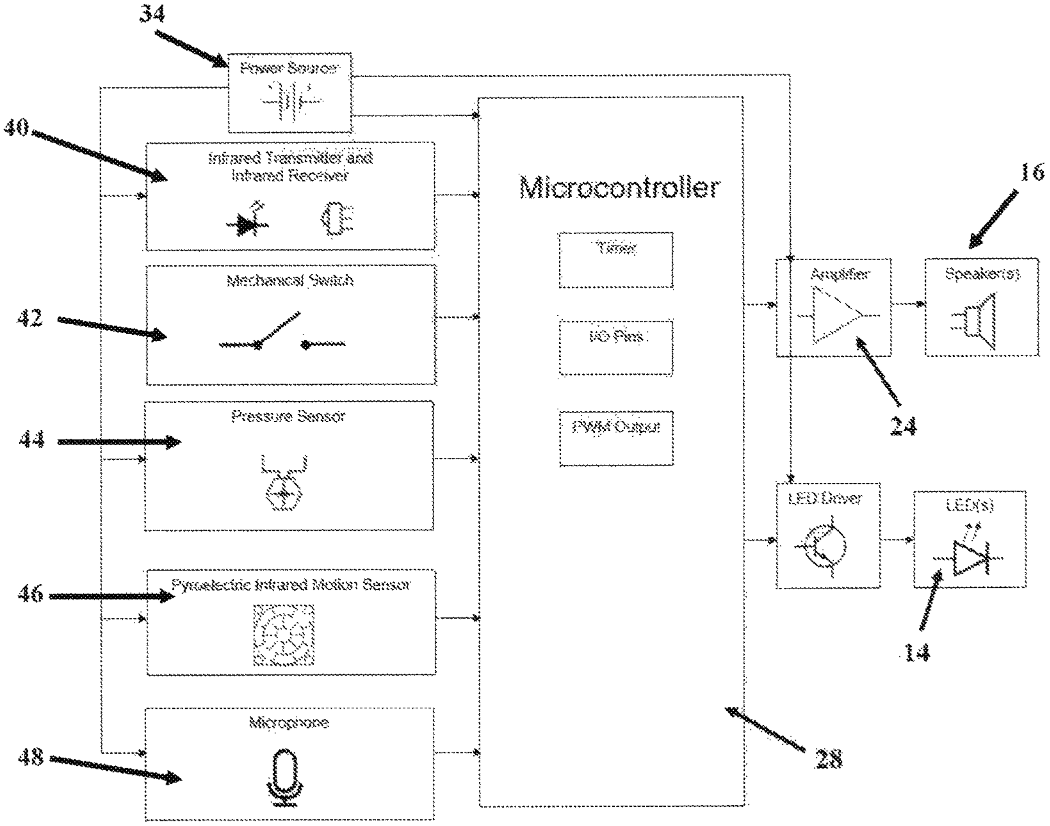
FIG. 4 is a diagram of one example of fire effect circuitry used by the sensor activated trashcan in accordance with the present invention.
Figure 5:
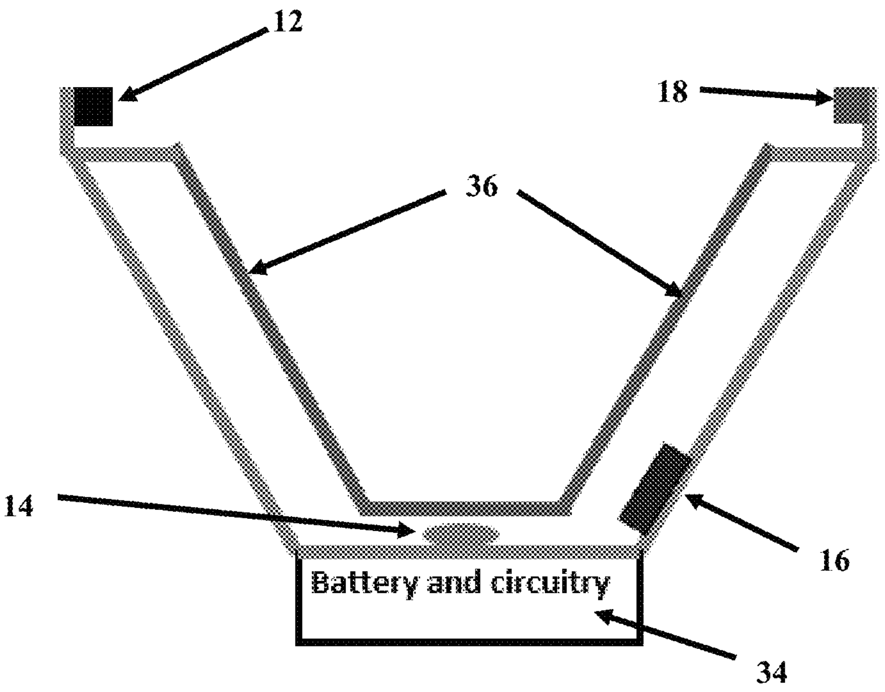
FIG. 5 is a graphical representation of a side view of the fire effect sensor activated trashcan illustrating the interior housing features in accordance with the present invention.

More specifically and turning once again to FIGS. 1 through 5, in one preferred embodiment the sensor comprises an infrared LED 18 and infrared receiver 12 arranged to produce an IR break-beam detector system for detecting trash being thrown into the trashcan. The infrared receiver 12 indicates the detection status to a microcontroller 28 as shown in FIG. 4. More specifically, the microcontroller 28 interfaces using a power supply 34 circuit with a high power RGB LED 14 and audio circuitry 24. When the infrared receiver 12 indicates trash detection, the microcontroller 28 causes the LED 14 to turn on and flicker with an orange/yellow color using pulse-width modulation for a short interval. A speaker 16 produces fire crackling sounds that are also activated and play during this short interval through speaker cutouts located on the side 20 of the trashcan body 10. Additionally, the trashcan may be frosted and semi-transparent and/or clear wherein a high power LED 14 is located at the trashcan's bottom center facing upwards such that its light diffuses over the trashcan's walls to simulate the orange color like fire.

It should also be understood that the term trashcan also means a wastebasket or the like, wherein the present invention consists of the following features:

1. The "fire effect" of the trashcan consists of:

a. The side walls of the trashcan illuminate and flicker with an orange light spectrum that simulates a fire.

b. Realistic fire crackling sounds play from the trashcan speakers 16.

2. The fire effect conditionally and temporarily turns on with different methods of activation.

3. The fire effect occurs immediately after the activation method has been triggered, or after a delay from the activation trigger, or after the activation trigger has ended.

4. Methods of activation of the temporary fire effect include:

a. Sensors around the top rim of the trashcan detect when trash is thrown in and activate the fire effect. An example of this is the IR break beam sensor configuration 40 as is well known in the prior art.

b. Hand, foot, or body proximity using a motion sensor 46, infrared sensor 40, or other proximity sensor activates the fire effect.

c. Touching or moving the trashcan lid with a pressure sensor 44, infrared sensor 40, mechanical switch 42, or other touch or motion sensor activates the fire effect.

d. Pressing down on a foot pedal activates a mechanical switch 42 located within the trashcan for producing the fire effect.

e. Touching a sensor with your foot at the base of the trashcan using an infrared sensor, pressure sensor, or other touch sensor activates the fire effect.

f. A voice command or external sound received by a microphone 48 activates the fire effect.

Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

What is claimed is:

1. A trashcan having a sensor activated fire effect, the trashcan comprising:

a trashcan body having a top opening, a sidewall and a bottom;

a visible light LED disposed opposite the top opening and configured to emit light toward the sidewall;

a sensor proximal the top opening, the sensor in communication with a microcontroller;

the microcontroller configured to activate the visible light LED, causing it to flicker, thereby simulating a fire in the trashcan body, for a predetermined time interval upon receiving a signal from the sensor; and a speaker in communication with the microcontroller, wherein the microcontroller is configured to cause the speaker to emit a crackling fire sound while the visible light LED is activated.

2. The trashcan of claim 1 wherein the sensor comprises an infrared LED emitter and an infrared receiver disposed in opposition to, and facing each other such that the infrared receiver is within range of receiving a signal from the infrared LED emitter, and configured such that the infrared receiver detects an object interrupting the signal between the infrared LED emitter and the infrared receiver.

3. The trashcan of claim 1 wherein the microcontroller uses pulse width modulation to cause the visible light LED to flicker.

4. The trashcan of claim 1 wherein the speaker is mounted on a sidewall of the trashcan and aimed away from the trashcan.

5. The trashcan of claim 1 wherein the microcontroller is configured to activate the visible light LED such that a sidewall of the trashcan body illuminates and flickers with an orange light spectrum, thereby simulating a fire.

6. The trashcan of claim 1 wherein the microcontroller conditionally and temporarily turns on the visible light LED with a method of activation chosen from the list of an IR sensor, a motion sensor, a pressure sensor, a switch sensor, a pedal sensor, or a voice command sensor.

7. The trashcan of claim 1, wherein the microcontroller operates after a predetermined delay once the sensor has been activated.

8. The trashcan of claim 1 wherein a plurality of sensors are located around the top opening, and wherein the microcontroller activates the visible light LED and the speaker upon activation of at least one of the plurality of sensors.

9. The trashcan of claim 1 wherein a lid is mounted to the top opening of the trashcan body and configured such that touching or moving the trashcan lid causes microcontroller to activate the visible light LED and the speaker.

10. The trashcan of claim 1, wherein the microcontroller activates the visible light LED and the speaker upon a user pressing down on a foot pedal in communication with a mechanical switch located within the trashcan body.

* * * * *